March 10, 1953     A. L. M. A. ROUY     2,630,735
COLORIMETER
Filed Nov. 8, 1949     3 Sheets-Sheet 1
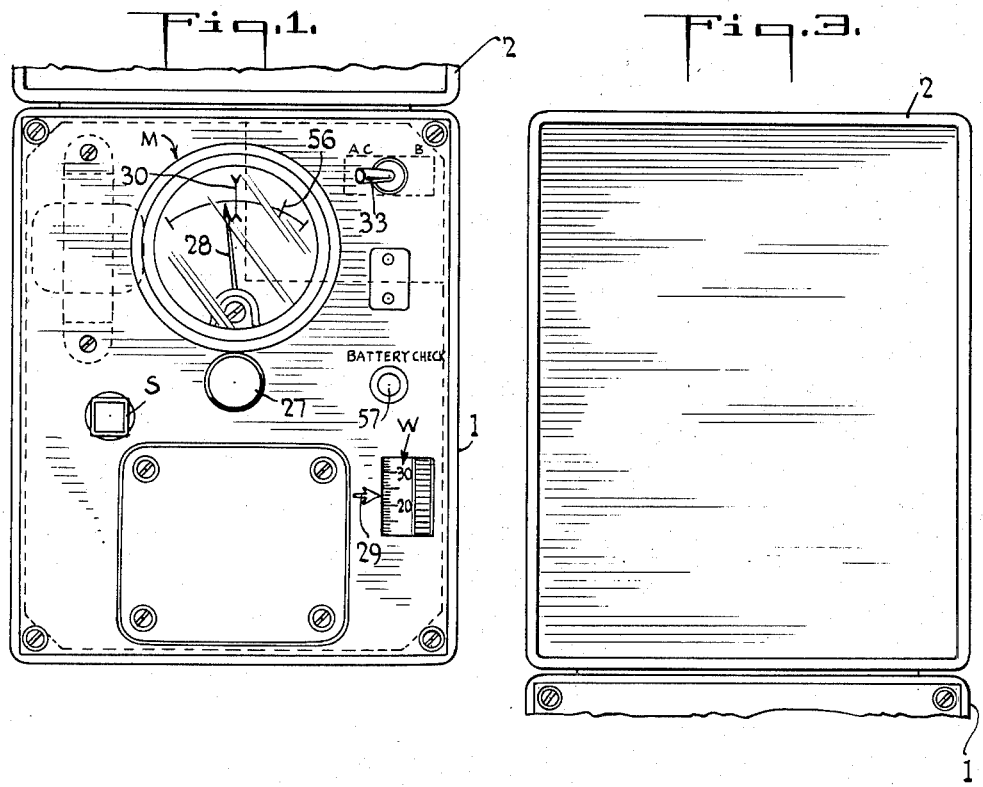
INVENTOR.
Auguste Louis Marie Antoine Rouy
BY
Lyman E. Dodge
ATTORNEY

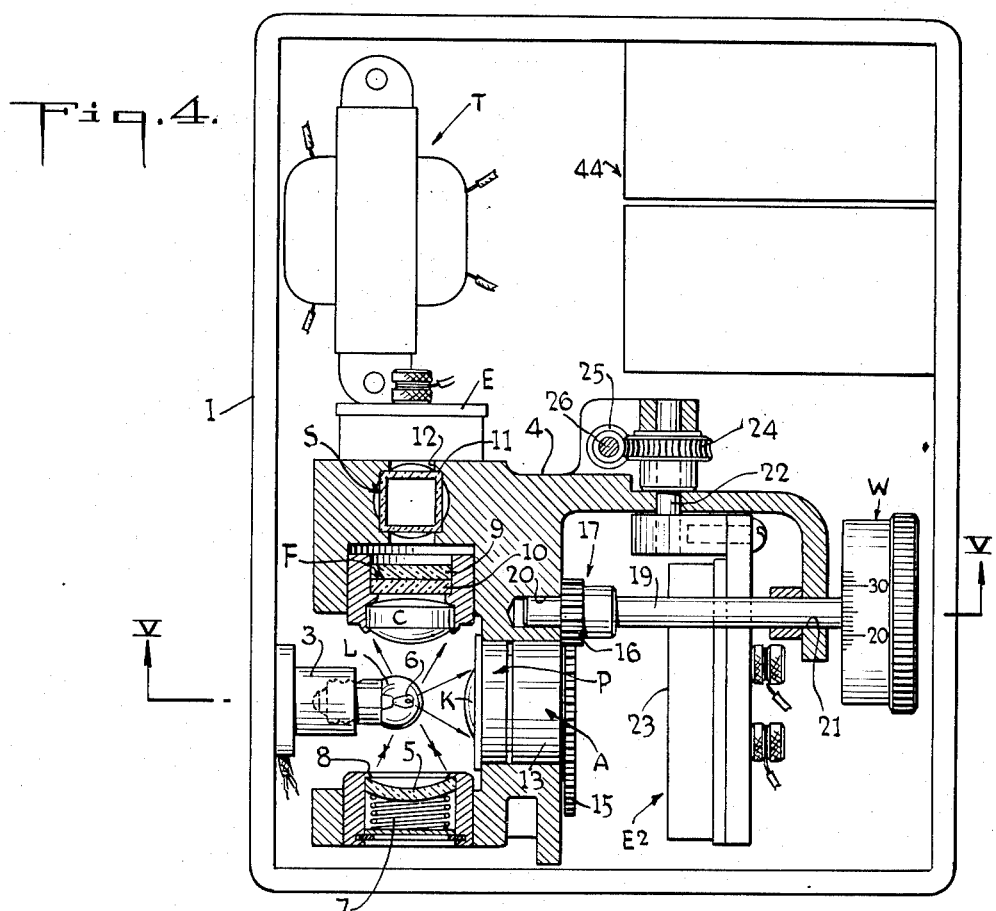
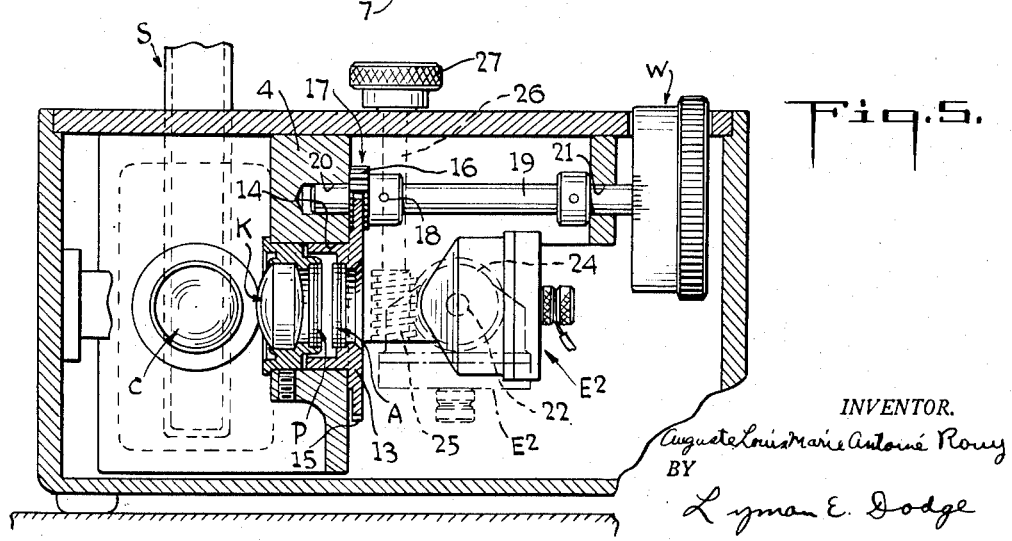

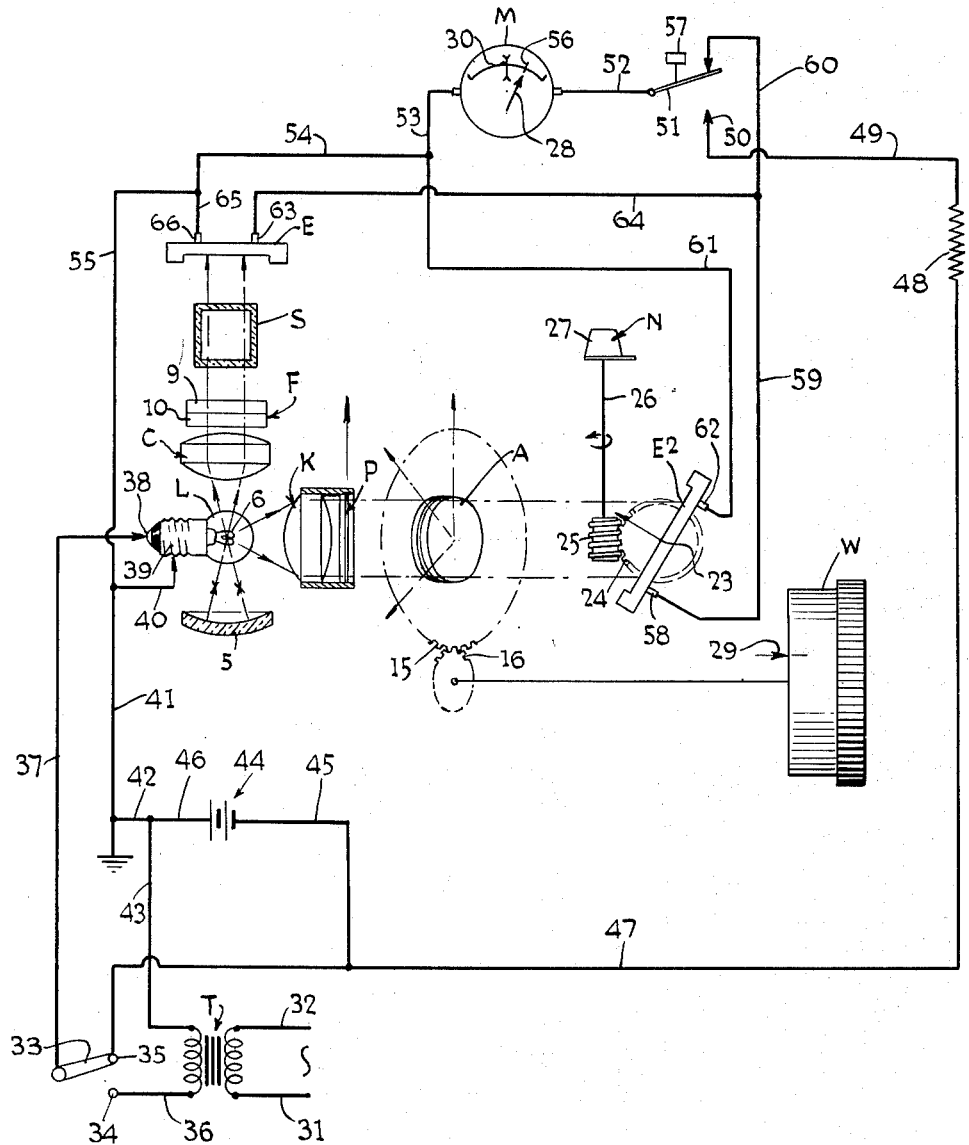

Patented Mar. 10, 1953

2,630,735

UNITED STATES PATENT OFFICE 2,630,735
COLORIMETER
Auguste Louis Marie Antoine Rouy,
New York, N. Y.

Application November 8, 1949, Serial No. 126,066

3 Claims. (Cl. 88—14)

This invention relates to a colorimeter.

A principal object of this invention is the production of a colorimeter of such construction that measurements of concentration of solutes in solvents will be independent of light source intensity variations.

A further object of the invention is the production of a device of the type specified in which measurements of light absorption will be in terms of mechanical angular displacements.

A further object of the invention is the production of a device of the type specified in which setting of the indicating means to zero may be accomplished without affecting the spatial distribution of a light energy impinging on the light responsive means and without changing the electrical characteristics of the light responsive means.

Other objects and advantages will appear as the description of the particular physical embodiment selected to illustrate the invention progresses and the novel features will be particularly pointed out in the appended claims.

In describing the invention in detail and the particular physical embodiment selected to illustrate the invention, reference will be had to the accompanying drawings and the several views thereon, in which like characters of reference designate like parts throughout the several views, and in which:

Fig. 1 is a top plan view of a construction embodying my invention of colorimeter with the cover thereof shown fragmentarily; Fig. 2 is an end view of the device as shown by Fig. 1 as viewed from the bottom of Fig. 1 with the cover shown in section; Fig. 3 is a plan view of the interior of the cover of the device as shown by Fig. 1 with a fragment of the main case attached thereto; Fig. 4 is a cross sectional view of the device as shown by Fig. 2 on the plane indicated by the line IV—IV viewed in the direction of the arrows at the ends of the line; Fig. 5 is a cross sectional view of the device as shown by Fig. 4 on the plane indicated by the line V—V viewed in the direction of the arrows at the ends of the line; Fig. 6 is a diagrammatic or schematic view of my complete arrangement of colorimeter.

The colorimeter of my invention, generally speaking, embodies a source of light L, best shown in Fig. 6, a condensing lens C, a filter F, a solution container S, a photo-electric cell E and an ammeter or microammeter M. In addition it embodies the condenser K, a polarizer P, the analyzer A and a second photo-electric cell $E^2$.

The analyzer A is rotatable about the axis of the light beam by a finger wheel W and the photo-electric cell $E^2$ is oscillatable about an axis by the thumb knob N.

A source of energy is supplied to energize the lamp L.

Zero adjustment of the instrument is made by placing a solution of the solvent alone in the receptacle S and then bringing the microammeter to a null position by manipulating knob N.

The determination of the concentration of a solute in a solvent is made by placing the solution in the receptacle S after the microammeter M has been brought to the null position and then oscillating the analyzer A until the hand of the microammeter M again comes to the null position. The angular displacement of W measures the concentration of the solute in the solvent in the receptacle S.

My preferred embodiment is well illustrated by Figs. 1 to 5 inclusive.

Numeral 1 designates a base or enclosing case for the various devices making up the complete colorimeter. The case also has a cover 2 which, when in place, protects the various protruding parts of the apparatus.

The lamp L is held in any suitable or appropriate base 3 attached to the side of the base of the casing.

A frame designated as a whole by 4 is positioned within the base and supports and positions the most vital and essential parts of the apparatus.

A reflecting mirror 5 is positioned to receive the light from L and reflect it to the condenser C. This mirror has a spherical surface, the center of curvature of which is the filament 6 of the lamp L. The mirror 5 is held in position by a spring 7. The spring 7 holds the mirror 5 firmly against the overhanging edge 8 of the mirror mount.

The condenser or collimator C is an ordinary and well known lens for receiving and rendering the light beams parallel. The filter F will be of a color properly selected, in accordance with well known colorimetric knowledge to properly combine with the particular colored solute being determined. It is preferred to make the filter F in two parts as 9 and 10.

The solution container S may well be made of glass and preferably of a square cross section and of dimensions such that it will fit closely and snugly within a cavity 11 formed in the member 4.

The photo-electric cell, such as a selenium cell, is attached in any suitable or appropriate manner to the member 4 so that its sensitive surface will be in a position to receive light from the lamp L which passes through the condenser C, the filter F and the receptacle S, and in order for this to occur a passageway 12 is formed through the member 4.

Another condensing or collimating lens K is positioned, preferably, in which might be considered a position at a right angle from condensing lens C. The light from lamp L impinges upon this condensing lens K and then impinges upon the polarizer P and after passing through that polarizer impinges upon the analyzer A. Any light passing through the analyzer A impinges upon the photo-electric cell $E^2$.

As will be seen, most clearly by reference to Fig. 6, the photo-electric cell E is connected to the microammeter M. The photo-electric cell $E^2$ is also connected to the microammeter M in opposition to the cell E.

The analyzer A may be oscillated about the common axis of itself and polarizer P, and the light beam as best shown in Figs. 4 and 5. The analyzer A is held in the analyzer frame 13 which seats or is journaled in the bore 14 of the member 4. The frame 13 is provided with teeth 15 which engage with teeth 16 of a gear wheel 17 pinned as by pin 18 to shaft 19 having one end journaled in an orifice 20 of body 4 and journaled adjacent the other end in bore 21. This shaft 19 also carries the graduated finger wheel W fixedly attached thereto.

The photo-electric cell $E^2$ is supported on a shaft 22 journaled in a bore in body 4. The longitudinal center line of the shaft prolonged is tangent to the sensitive surface 23 of the photo-electric cell $E^2$ so that when the shaft 22 is oscillated the photo-electric cell $E^2$ is oscillated about an axis tangent to its sensitive surface which may be considered as a vertical axis 23 as viewed in Fig. 6, but which in reality is a horizontal axis, as viewed in Figs. 4 and 5. This tangent line is also at a right angle to the beam of light from lamp L.

The oscillation of shaft 22 may move the photo-electric cell $E^2$ from the full line position as shown in Fig. 5 to the dotted line position. In order to rotate shaft 22 I provide a worm wheel 24 attached to the shaft 22 and a worm 25 cooperating with the worm wheel 24. The worm 25 is fixedly attached to a shaft 26 which terminates in a finger knob 27 projecting from the top of the case.

Before making a determination by means of the instrument, the microammeter M has its indicating hand 28 brought to a central null position. This is done by placing solvent alone, which is to be used in dissolving the solute to be determined, in the container S. The lamp L is then lighted and the wheel W is rotated until the zero of the wheel comes opposite the fixed mark 29, best shown in Fig. 1. Then the knob N is moved one way or the other until the indicating hand 28 rests in the central null position, that is, corresponding to the line 30 of Fig. 1.

After this has been done the solute in the same solvent is placed in the container S and without disturbing any of the other adjustments, the analyzer A is oscillated on its axis by the finger wheel W until the indicating hand 28 assumes the normal or null position. The amount of solute in the solvent is a function of the angular movement of the analyzer A, that is, of the finger wheel W. This angular movement is ascertained by a reading of the graduations of the wheel against the fixed mark 29 on the case.

Of course it is to be understood that the value of the angular rotation of wheel W in terms of percentage of solute in the solution in container S, must be determined by a calibration of the instrument with known percentages of solutes.

It is also to be understood that polarizer P simply polarizes the light from lamp L and that the angular position of the analyzer A determines whether a greater or lesser quantity of light passes through A and impinges on $E^2$.

It is contemplated that the colorimeter of my invention may be used where commercial current is available. In such case, the transformer T will be connected by wires 31 and 32 to a source of commercial current and then the hand switch 33 will be moved to contact with contact 34 instead of with contact 35. The arm 33 extends from the top of the case to facilitate its manipulation. With arm 33 in contact with contact 34 current may be assumed to flow from transformer T through wire 36 to contact point 34, arm 33, wire 37, one terminal 38 of filament 6, through the filament, then to a metallic shell 39, then to wires 40, 41, 42 and 43 to the other terminal of the transformer T.

When a source of commercial current is used there is no doubt but that sufficient current will pass through the lamp L to give a proper amount of light energy to impinge upon the several photo-electric cells. However, it is contemplated that at times a local source of battery may be used to supply electric energy for illuminating the lamp L. This local source of energy is designated 44 and preferably would be a battery. My lamp L would be selected so that it could very well be properly energized by means of the ordinary and well known flash light battery. When the battery 44 is used the circuit would be from the battery to wires 45 and 46 to contact point 35 and then through arm 33 and through the circuit as hereinbefore described to wire 42 and from there by wire 46 to the other terminal of the battery.

When the battery is used it is necessary to be certain that it has not deteriorated to such an extent as to be unable to supply proper electrical energy to lamp L. To provide for this I arrange a test circuit as follows:

One terminal of the battery 44, wires 45 and 47, fixed resistance 48, wire 49, contact point 50, arm 51 when moved down into contact with contact point 50, wire 52, microammeter M, wires 53, 54, 55, 41, 42 and 46 to the other terminal of the battery. I arrange my resistance 48 such that the battery 44 will cause the indicating hand 28 of the microammeter to move to the mark designated 56, as best shown in Fig. 1, if the battery is in proper condition. If it fails to move to that extent from the null position then the battery should be renewed.

The thumb piece 57 by which arm 51 is manipulated extends through the top of the case, as best shown in Fig. 1, and the arm 51 has a bias to the position as shown in Fig. 6 connecting the microammeter with the photo-electric cell, the circuits of which are in parallel.

The circuit of $E^2$ may be considered as from terminal 58 through wires 59 and 60 to arm 51 and thence by wire 52 to microammeter M and then by wires 53 and 61 to the other terminal 62 of the photo-electric cell. The circuit of photo-electric cell E may be considered as from terminal 63 through wires 64 and 60 to switch arm 51 and thence by wire 52 to micro-ammeter M and then by wires 53, 54 and 65 to terminal 66.

The polarizing materials employed by me are preferably the well known Polaroid. A polarized filter of this construction consists of a thin layer of tiny needle-like dichroic crystals of herapathite (iodo-quinine sulphate) in parallel orientation, embedded in a plastic matrix and enclosed for protection between two transparent plates.

Although I have particularly described one particular physical embodiment of the invention and explained the construction and principle thereof, nevertheless, I desire to have it understood that the form selected is merely illustrative, but does not exhaust the possible physical embodiments of the idea of means underlying my invention.

What I claim as new and desire to secure by Letters Patent is:

1. A device for comparing materials on the basis of the absorption of light thereby, including, in combination, a light source, two collimators, one for transmitting a beam of light in one direction from the source and the other for transmitting a beam of light in another direction from the source, a first photo-electric cell provided with terminals positioned to receive the light of one beam, a second photo-electric cell provided with terminals positioned to receive light from the other beam, said second photo-electric cell being mounted for rotation about an axis passing through the plane of its light receiving surface, a polarizer and an analyzer positioned between the collimator and the said second photo-electric cell, said analyzer being mounted for rotation about an axis parallel to the beam whereby a maximum or a minimum of light may be transmitted to the said second photo-electric cell, an electric indicating device provided with terminals and having a movable indicating part, said movable indicating part having a rest position and movable in either of two directions therefrom, the terminals of the photo cells connected electrically to the terminals of the electrical indicating device in opposition whereby with the analyzer in rotated position to pass the maximum of light the movable indicating part of the electric device may be caused to assume the intermediate rest position by rotation about its axis of the said second photo-electric cell and whereby, when a light absorbing material is positioned in the beam of light received by the said first photo-electric cell, thereby disturbing the electrical balance, the electrical balance may be restored by a rotation of the analyzer, and means to measure the amount of said rotation of the analyzer.

2. A device for comparing materials on the basis of the absorption of light thereby, including, in combination, a source of light, two collimators, one for transmitting a beam of light in one direction from the source and the other for transmitting a beam of light in another direction from the source, a first photo-electric cell provided with terminals positioned to receive the light of one beam, a second electric cell provided with terminals positioned to receive light from the other beam, said second photo-electric cell being mounted for rotation about an axis passing through the plane of its light receiving surface, a polarizer and an analyzer positioned between the collimator and the said second photo-electric cell, said analyzer being mounted for rotation about an axis parallel to the beam whereby a maximum or a minimum of light may be transmitted to the said second photo-electric cell, an electric indicating device provided with terminals and having a movable indicating part, said movable indicating part having a rest position and movable in either of two directions therefrom, the terminals of the photo cells connected electrically to the terminals of the electrical indicating device in opposition whereby with the analyzer in rotated position to pass the maximum of light the movable indicating part of the electric device may be caused to assume the intermediate rest position by rotation about its axis of the said second photo-electric cell and whereby, when a light absorbing material is positioned in the beam of light received by the said first photo-electric cell, thereby disturbing the electrical balance, the electrical balance may be restored by a rotation of the analyzer, and means to measure the amount of said rotation of the analyzer, a source of electrical energy for generating light at the light source and electrical conducting means connecting the source of energy and the said electrical indicating device whereby the condition of the electrical source may be indicated by a manual manipulation.

3. A device for comparing materials of the basis of the absorption of light thereby, including, in combination, a source of light, two collimators, one for transmitting a beam of light in one direction from the source and the other for transmitting a beam of light in another direction from the source, a first photo-electric cell provided with terminals positioned to receive the light of one beam, a second electric cell provided with terminals positioned to receive light from the other beam, said second photo-electric cell being mounted for rotation about an axis passing through the plane of its light receiving surface, a polarizer and an analyzer positioned between the collimator and the said second photo-electric cell, said analyzer being mounted for rotation about an axis parallel to the beam whereby a maximum or a minimum of light may be transmitted to the said second photo-electric cell, an electric indicating device provided with terminals and having a movable indicating part, said movable indicating part having a rest position and movable in either of two directions therefrom, the terminals of the photo-cells connected electrically to the terminals of the electrical indicating device in opposition whereby with the analyzer in rotated position to pass the maximum of light the movable indicating part of the electric device may be caused to assume the intermediate rest position by rotation about its axis of the said second photo-electric cell and whereby, when a light absorbing material is positioned in the beams of light received by the said first photo-electric cell, thereby disturbing the electrical balance, the electrical balance may be restored by a rotation of the analyzer, and means to measure the amount of said rotation of the analyzer, an electric battery for supplying electrical energy for generating light at the source, a transformer for supplying electrical energy for producing light at source of light, means for connecting said transformer to an outside source of alternating electric current, a manually operable switch for alternatively connecting the battery or the transformer to the light generating source, and a manually operable means and electrical conductors for connecting the battery to the electrical indicating device for ascertaining the condition of the battery.

AUGUSTE LOUIS MARIE ANTOINE ROUY.

REFERENCES CITED

The following references are of record in the file of this patent:

UNITED STATES PATENTS

| Number | Name | Date |
|---|---|---|
| 2,015,675 | Hays | Oct. 1, 1935 |
| 2,263,938 | West | Nov. 25, 1941 |
| 2,302,554 | Kingsbury | Nov. 17, 1942 |
| 2,477,208 | Rouy | July 26, 1949 |

FOREIGN PATENTS

| Number | Country | Date |
|---|---|---|
| 386,537 | Germany | Dec. 10, 1923 |